United States Patent [19]

Levine

[11] Patent Number: 5,748,716

[45] Date of Patent: *May 5, 1998

[54] TELEPHONICALLY PROGRAMMABLE APPARATUS

[75] Inventor: Michael R. Levine, Boca Raton, Fla.

[73] Assignee: Smart VCR Limited Partnership, Birmingham, Mich.

[*] Notice: The term of this patent shall not extend beyond the expiration date of Pat. No. 5,414,756.

[21] Appl. No.: 713,900

[22] Filed: Sep. 13, 1996

Related U.S. Application Data

[63] Continuation of Ser. No. 438,109, May 8, 1995, abandoned, which is a continuation of Ser. No. 185,308, Jan. 21, 1994, Pat. No. 5,414,756, which is a continuation of Ser. No. 904,553, Jun. 26, 1992, abandoned.

[51] Int. Cl.[6] ............................................. H04M 11/00
[52] U.S. Cl. ................ 379/102.03; 379/67; 379/102.01
[58] Field of Search ........................... 379/67, 88, 89, 379/90, 93, 97, 98, 102, 105, 102.01, 102.02, 102.03, 93.12; 348/5, 6, 7, 8, 9, 10, 11, 12, 13, 14

[56] References Cited

U.S. PATENT DOCUMENTS

| | | | |
|---|---|---|---|
| 4,593,157 | 6/1986 | Usdan | 379/102 |
| 4,625,080 | 11/1986 | Scott | 379/104 |
| 4,640,992 | 2/1987 | Rose | 379/105 |
| 4,751,578 | 6/1988 | Reiter et al. | 358/183 |
| 4,787,063 | 11/1988 | Muguet | 364/900 |
| 4,841,132 | 6/1989 | Kajitani et al. | 235/472 |
| 4,847,696 | 7/1989 | Matumoto et al. | 358/335 |
| 4,885,766 | 12/1989 | Vasuoka et al. | 379/102 |
| 4,907,079 | 3/1990 | Turner | 358/84 |
| 4,908,713 | 3/1990 | Levin | 358/335 |
| 4,933,968 | 6/1990 | Iggulden | 379/213 |
| 4,963,994 | 10/1990 | Levine | 358/335 |
| 5,003,384 | 3/1991 | Darden | 358/84 |
| 5,014,125 | 5/1991 | Pocock et al. | 379/105 X |
| 5,016,273 | 5/1991 | Hoff | 380/10 |
| 5,038,211 | 8/1991 | Hallenback | 358/142 |
| 5,089,885 | 2/1992 | Clark | 358/86 |
| 5,151,789 | 9/1992 | Young | 358/194.1 |
| 5,172,413 | 12/1992 | Bradley | 380/20 |
| 5,199,062 | 3/1993 | Von Meister et al. | 379/67 |
| 5,216,228 | 6/1993 | Hasimoto | 379/102 |
| 5,223,924 | 6/1993 | Strubbe | 358/86 |
| 5,228,077 | 7/1993 | Darbee | 379/102 |
| 5,255,313 | 10/1993 | Darbee | 379/102 |
| 5,404,393 | 4/1995 | Remillard | 379/105 |
| 5,532,832 | 7/1996 | Hailey et al. | 358/335 |
| 5,546,193 | 8/1996 | Hailey et al. | 358/335 |
| 5,570,415 | 10/1996 | Stretton et al. | 379/102 X |

*Primary Examiner*—Krista Zele
*Assistant Examiner*—Scott L. Weaver
*Attorney, Agent, or Firm*—Gifford, Krass, Groh, Sprinkle, Patmore, Anderson & Citkowski

[57] ABSTRACT

To initialize a remote control device for use in a particular installation, initialization parameters are entered relating to the relationship between user input codes and equipment to be controlled. In the preferred embodiment involving video recorder equipment, the initialization procedure concerns the video channels available to the recorder and remote control codes associated with the operation of the recorder using a receive-only modem on the device attached to a phone jack. initialization is performed by dialing up a remote location with a touch tone phone. At the remote end a computer sends selected audio response signals to the telephone receiver requesting that the user key in information using the touch tone pad. The computer then transmits the appropriate signals to the memory of the remote device to initialize it.

20 Claims, 2 Drawing Sheets

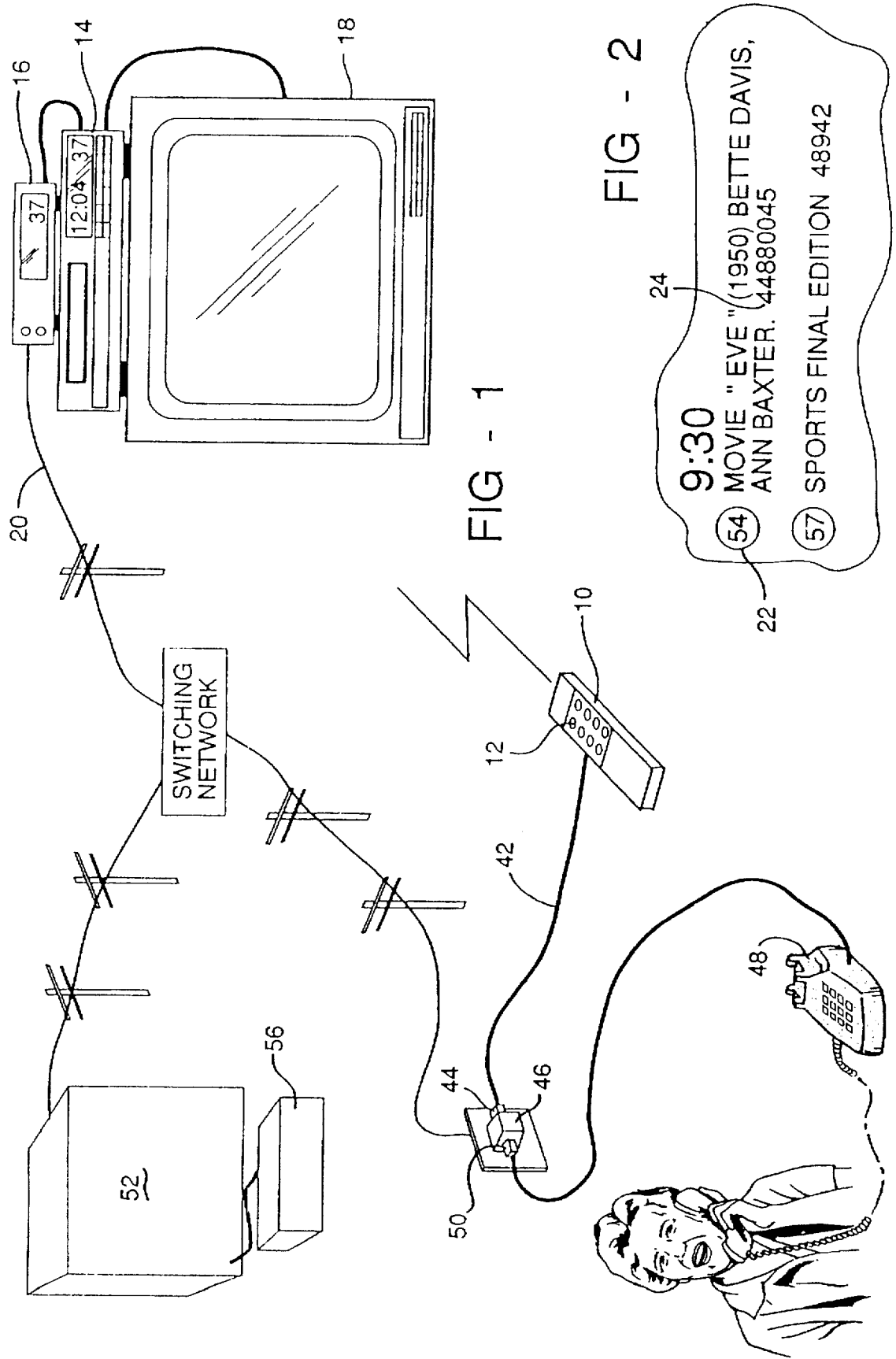

TELEPHONICALLY PROGRAMMABLE APPARATUS

This application is a continuation of application Ser. No. 08/438,109 filed May 8, 1995, now abandoned, which is a continuation of Ser. No. 08/185,308 filed Jan. 21, 1994, now U.S. Pat. No. 5,414,756, which is a continuation of application Ser. No. 07/904,553 filed Jun. 26, 1992, now abandoned.

FIELD OF THE INVENTION

This invention relates to programmable control devices and methods of initializing them for use in a particular environment and more particularly to a programmable device adapted to be connected to a telephone system and initialized from a remote location via interactive communication involving audio signals requesting operator responses via a keypad.

BACKGROUND OF THE INVENTION

The development of very low cost microprocessors in the form of integrated circuits has led to their incorporation in a variety of control devices for use in homes or business places. Many of these devices require no special initialization or programming before they may be used, but others must be programmed before use to initialize them for the particular control environment in which they are to be used. For example, a programmable thermostat capable of controlling a home HVAC system to obtain desired temperatures at all times on a weekly basis must be initialized with the desired program of times and temperatures before it can be used. Another microprocessor based device with a program which must be initialized is a remote control for video cassette recorders to allow the recording of selected future programs. Manufactured by Gemstar, Inc. of Los Angeles, Calif., and sold under the VCR Plus trademark, the operator programs the device to achieve the future recording of a particular desired TV program by entering into the device's keyboard a short numerical code printed in association with the desired program listing in a television guide. The device then transmits infrared codes to the video cassette recorder, and an associated cable tuner if one is used, to control the energization and tuning of the units to achieve recording of that particular program.

These units must be initialized for use in a particular environment. Assume, for example, that the same TV listings are made available to two users of the controls who subscribe to different cable systems and own different VCRs and each of the users wants to record the same program and will key the same codes into their remote devices. The infrared signals sent out by the two devices to the user's respective VCRs must differ from one another because of two factors: first, a given TV station will likely be received on a first channel over one cable system and on a different channel on another cable system; and second, the control codes required to tune and energize the two VCRs will differ from one another. Accordingly, during initialization the remote device must be programmed with information as to the cable channels on which particular stations are received and as to the nature of the control codes of the associated VCRs and cable boxes. This is typically achieved by throwing a switch on the remote device into a "learn" mode in which the operator keys in information relating to the channel allocation of cable system and the nature of the control codes of the VCR and cable box, and the present time in a manner described in an operator's manual. This initialization routine is quite complicated and many users abandon the devices in frustration during an attempted initialization routine. The need for a simplified method of initializing the programming of such control devices is apparent.

SUMMARY OF THE INVENTION

The present invention is accordingly directed toward a novel method of initializing a programmable control device by connecting the device to a telephone system, dialing a remote initializing center preferably employing a computer, and providing the computer with information as to the environment of the control device by using touch tone keys to respond to audio inquiries transmitted by the computer, so that the computer can transmit the initializing program for loading in the memory of the control device. The present invention is also directed toward such a programmable control device which is adapted to be connected to a telephone system.

While the present invention may be used in connection with a variety of control devices which require program initialization, a preferred embodiment of the invention is utilized in connection with a programmable, remote control device for achieving recording of future programs on a video recorder, of the type previously described, and the preferred embodiment of the invention will be described in connection with such a device.

Rather than initializing the program of the video recorder remote control by the user entering information through the keypad of the device, as has been done in the prior art, the present invention provides an electrical connection between a receive-only modem connected to the microprocessor of the remote control device and a telephone system jack. This connection allows digital signals transmitted to a phone terminal to be entered into the memory of the remote device in order to program the memory. These initializing signals are preferably sent from a computer at a remote location, although they may be manually generated at the remote location. In a preferred embodiment of the invention, the computer at the remote location includes a source of a number of audio messages.

To initialize a unit the operator plugs a cord on the unit into a phone jack and dials the remote computer from a touch tone phone connected to the same phone circuit. The computer then transmits a series of audio messages to the operator which generally require the operator to respond with an entry on the touch-tone phone keypad. In order to determine the cable system to which the video recorder to be controlled is connected, the computer may detect the location of the programmable device through use of conventional telephone caller identification circuitry, or, as a first alternative, the computer may transmit an audio message inquiring as to the postal Zip Code of the location, or, as a second alternative the computer may desire the cable system identification from the response to a request for the cable box model number. The computer will include a data base relating Zip Codes to particular cable systems and mapping the channel allocation of each system. Similarly, the computer will transmit inquiries as to the nature of the controlled VCR and cable box. Using this information, the computer will transmit digital codes over the phone system which will be decoded by the modem and fed into the memory of the remote device in order to initialize its program. The computer will also send time signals to set the internal clock of the control device, relieving the user of that task.

This interactive system is as simple to use as an automatic bank teller machine since the remote computer will guide the operator through the required operations.

The method and apparatus of the present invention greatly simplify the initialization of programmable control devices to allow commercialization of a variety of devices which would otherwise require very complicated programming. The method and apparatus of the present invention also promotes the utilization of existing devices requiring initialization by simplifying the initialization routine.

Other objectives, advantages and applications of the present invention will be made apparent by the following detailed description of a preferred embodiment of the invention. The description makes reference to the accompanying drawings in which:

BRIEF DESCRIPTION OF THE DRAWINGS

FIG. 1 is a perspective, somewhat schematic illustration of the apparatus of the present invention connected for initialization of a programmable remote control for video recorders;

FIG. 2 is an illustration of a section of a television program guide incorporating Gemstar code numbers with each program listing.

DETAILED DESCRIPTION OF THE PREFERRED EMBODIMENT

Figure 3:
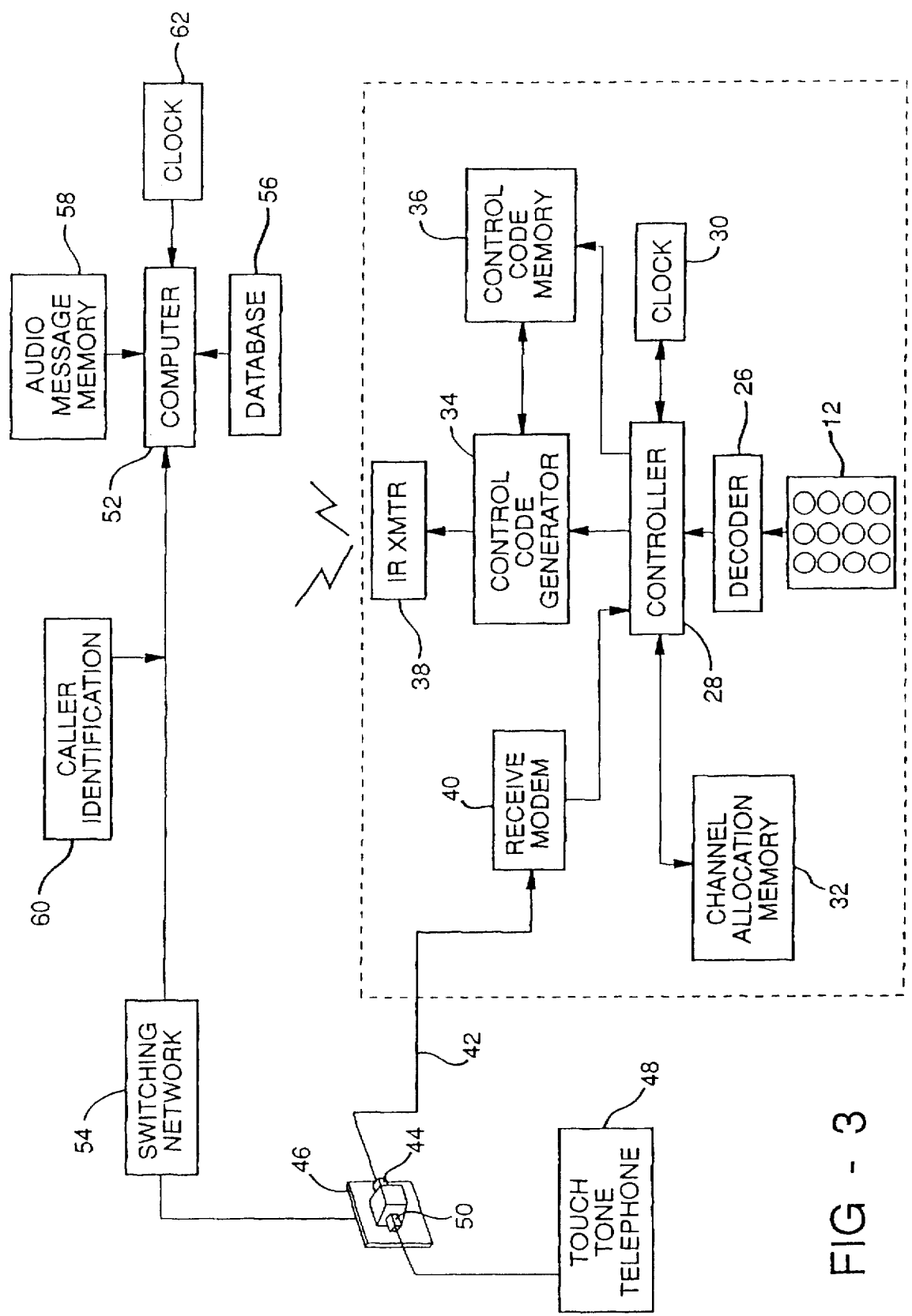
FIG. 3 is an electrical schematic diagram of the system of FIG. 1.

The preferred embodiment of the invention, illustrated in FIG. 1, operates to configure, or initialize, the memory of a device of the general type sold under the Video Plus trademark, for use in a particular home control environment. The Video Plus device 10 is a remote control unit of hand-held size, including a digital operator keyboard 12, operative to transmit infrared control signals to a video recorder 14, and cable box 16 if one is used in the installation, in order to cause the units to record particular video programs so that the programs may be later viewed over a television receiver 18. In a typical installation the television signals are received over a cable 20, although a system may be used with a satellite source of TV programming signals or may receive broadcast signals.

When the operator of the unit wants to program the system to record a television program occurring at a later time, the operator will consult a television schedule guide printed in a magazine such as TV Guide or a local newspaper. A section of a typical guide is illustrated in FIG. 2. Each program listing 22 includes a decimal number 24, typically ranging from four to nine digits. These numbers encode information relating to the television channel of occurrence, start time and stop time of the associated television program. The numbers are provided to publishers of the television program listings by Gemstar, Inc. They are encrypted in a special code, only known to Gemstar, and maintained as a trade secret.

The user enters the code 24 associated with the television program listing that is desired to record into the keyboard 12 of the unit 10. As will subsequently be described, the unit 10 transmits infrared control signals to the remotely controllable video recorder 14 and the remotely controllable cable box 16, at the time of occurrence of the programs, to suitably energize the units and tune them to the appropriate channels. The desired program is thus automatically recorded and may be viewed at a later, convenient time by playing the tape cassette containing the recorded program and viewing the program on the television receiver 18.

A schematic diagram of a remote control unit 10 is illustrated in FIG. 3. Although the exact construction of the VCR Plus remote control unit has been maintained as a trade secret by Gemstar, and although particular units now available may differ in certain particulars from FIG. 3, this schematic diagram represents a preferred embodiment of the present invention to which one of ordinary skill may refer to construct a unit which will operate similarly to that of a VCR Plus unit.

Referring to FIG. 3, the output of the keyboard 12 is provided to a decoder 26 which performs mathematical operations on the encoded listing 24 to produce signals representative of the channel, start time and stop time of the program which it is desired to record. These signals are provided to a microprocessor-based control 28. The operation of the decoder 26 may be performed by the controller 28. The controller, and the associated electronics of the unit 10, is preferably battery powered. A real time clock 30 is connected to the controller. The controller stores signals received from the decoder 26 and compares the start time and end time of decoded program listings with the real time signals provided by the clock 30 to determine the time to transmit control signals to the video recorder 14 and the cable box 16 if one is used.

The controller also connects to a channel allocation memory 32 which stores codes mapping the channel identified in a program listing with the channels provided to the system over the program source 20. The program schedule of FIG. 2 will typically be customized for particular geographic area, such as metropolitan Chicago. In that area, various subscribers to the publication containing the program schedule will employ different program sources 20, which as different cable systems serving part of metropolitan Chicago. A particular program source, such as the NBC television outlet in Chicago, will be received on different channels through different cable systems. Channel allocation memory 32 must store the mapping between the published listings and the channels over which particular television stations are provided to a given system through the source 20. Memory 32 must be initialized before the unit 10 may be used with a particular installation.

When the start time of a program to be recorded coincides with the real time as provided by the clock 30, the controller 28 transmits signals to a control code generator 34 specifying the channel to be tuned. The control code generator connects to a control code memory 36 which stores particular sequences of infrared signals which are utilized by the video recorder 14 and the cable box 16. For example, a General Electric video recorder 20 will typically employ a different set of remote control codes than will a Sony video recorder. Before the unit 10 may be employed in a given installation it is necessary to initialize the memory 36 with information as to the specific remote control codes of the units 14 and 16. Utilizing those control codes, the control code generator 34 provides signals to an infrared transmitter 38, which causes it to transmit the required infrared signals to the video recorder 14 and the cable box 16 in order to energize them and tune them to the required channel at the start time of a program to be recorded and to deenergize them at the end time of that program.

As heretofore described, the operation of the Video Plus unit 10 is conventional and requires that the operator perform a relatively lengthy and complicated initialization routine, involving setting the clock 30 to the real time, and loading the channel allocation memory 32 and the control code memory 36 with the required mappings. It will be understood that the arrangement of the units 26, 28, 30, 32, 34 and 36 may differ in various embodiments of the invention and all could be performed by a suitably programmed microprocessor.

In accordance with the present invention the unit 10 is also provided with a receive modem 40 which provides signals to the controller 28 during an initialization routine in order to initialize the clock 30, the channel allocation memory 32 and the control code memory 36. A cord 42 connects the receive modem 40 to a male phone plug 44 which may be plugged into a conventional phone jack 46 during the initialization operation. Phone jack 46 is preferably a T-connector adapted to receive two male plugs at the same time so that a conventional touch-tone telephone transceiver 48 may be plugged into the same telephone circuit as the plug 44. Alternatively, plug 44 and telephone transceiver male plug 50 could be plugged into jacks in different rooms which are connected to the same telephone circuit. As another embodiment, the unit 10 may be provided with a female phone-jack for receipt of the plug 50, eliminating the need for connector 46.

To begin the initialization routine the user preferably dials a toll-free number which connects the users installation to a remote, central computer 52 via the public telephone switching network 54.

Computer 52 has access to a data base 56 which stores information relating to channel allocation patterns of cable systems, satellite systems, TV broadcast stations and the like and also stores information relating to the control code patterns utilized by various makes and models of video recorders and cable control boxes. The data base 56 also preferably stores information relating to the geographic coverage of cable systems in the region served by the computer 52.

Computer 52 also connects to an audio message memory 58 which stores a number of messages that may be transmitted by the computer 52 to the unit 10 being initialized. The computer 52 is controlled by a suitable application program, to cause it to communicate interactively with the user of a touch-tone telephone 48 which calls up the computer. The computer sends audio messages to the telephone 48 requesting the operator to provide responses via the touch-tone keyboard relating to the program source 20 available to the operator and the manufacturer and model number of the video recorder 14 and cable box 16 so that their control codes may be determined by the computer 52 from information stored in the data base 56. The computer then transmits signals through the switching network and the cord 42 to the receive modem 40 within the unit 10 which provides the required initializing signals for the clock 30, channel allocation memory 32 and control code memory 36 to the controller 28.

For example, the computer may initially inquire as to whether a user system receives signals from a cable network, satellite network or conventional broadcast signals. The user may be requested to hit numeral 1 if a cable source is used, numeral 2 if satellite reception is used or 3 if broadcast reception is used. If cable reception is used, the computer may use caller identification circuitry to identify the location of the user and then consult the data base 56 to determine the cable system serving that geographic area. If more than one cable network serves a particular geographic area, the computer may transmit an audio message inquiring of the operator as to which of the two cable services is utilized.

Alternatively, the computer may transmit an audio message to the user inquiring as to the postal Zip Code of the user's location and may determine the nature of the cable service from that response. Similar inquiries as to the make and model number of the video recorder 14 and cable box 16 will enable computer 52 to determine the required mapping of the control code memory. Using a clock 62, the computer 52 will also transmit initializing signals for the clock 30 within the unit 10.

The entire initialization routine will only require a few minutes and the user will be guided in providing responses so that the user requires no special knowledge of the system.

After the system is initialized, the phone plug 44 may be removed from the jack 46 and the cord 42 may be stored for future use. The user may then proceed with operation of the Video Plus unit in the same manner as if it had been initialized in accordance with the prior art.

It will be apparent to those skilled in the art as to the manner in which other devices requiring program initialization be converted to the system of the present invention.

Having thus described my invention I claim:

1. In a control device of the type having a control program and an alterable memory for storing parameters related to said control program, apparatus for remotely configuring the alterable memory through a telephone system having first and second terminal ends defining a transmission path, comprising;

means for electrically coupling said control device to said first terminal end also having a dual-tone multi-frequency (DTMP) transceiver connected thereto;

a computer system connected to said second terminal end, including a source of audio messages; and an application program resident in said computer system, said program being operative, upon said first terminal end being connected to said second terminal end, to select certain of said audio messages for transmission to said second terminal end so that the audio messages are telephonically received at said first terminal end, said audio messages being selected to direct an operator at said first terminal end to enter responses relating to the operating environment of said control device, said responses causing said computer system to generate and transmit signals from said second terminal end to said control device which configure said alterable memory of said control device with said parameters.

2. The apparatus of claim 1 wherein said control device constitutes a remote control unit operative to control an electronic tuner forming part of a video recorder, and wherein said parameters relate to control codes used to operate said video recorder.

3. The apparatus of claim 2 wherein said parameters include conversion codes relating to channel assignments of a video program source connected to said video recorder.

4. The apparatus of claim 3 in which said remote control unit includes a keyboard and a remote control transmitter operative to transmit signals to said video recorder causing said video recorder to record a particular program identified by codes entered using said keyboard.

5. The apparatus of claim 1 further including means at said second terminal end for identifying the geographic location of said first terminal end and wherein at least certain of said parameters relate to said location of said first terminal end.

6. The apparatus of claim 3 including a wide band, multichannel cable as said video program source and further including means connected to said second terminal end for identifying the geographic location of said first terminal end upon receipt of said responses from said first terminal end and wherein said responses are provided to said application program for use in configuring the alterable memory of said control device.

7. The apparatus of claim 1 wherein said control device comprises a remote control for a video recorder having a multichannel cable as a source of video programming, and wherein one of the audio messages to said operator at the first terminal end includes a query as to the geographic location of said first terminal end.

8. The apparatus of claim 7 wherein said query relates to the postal zip code at said first terminal end.

9. The method of configuring a control device having a programmable memory for use in a particular application comprising:

connecting said programmable memory of said control device to a first terminal of a telephonic system;

connecting a dual-tone, multi-frequency (DTMF) telephone transceiver to said first terminal;

using said DTMF transceiver to connect said first terminal to a second terminal of said telephonic system;

transmitting a series of audio inquiries from said second terminal to said first terminal;

manually inputting responses to said audio inquiries onto keys of said DTMF transceiver;

using said responses to formulate configuring signals for said programmable memory of said control device;

transmitting said configuring signals to said programmable memory through said telephonic system.

10. The method of claim 9 wherein said audio inquiries are generated by a computer.

11. The method of claim 9 in which said control device controls a video recorder interfaced to a multichannel cable source of video programming through a cable tuner and wherein said configuring signals include data relating to the relationship between codes entered into the control device by said operator and channel designations of said multichannel cable source.

12. The method of claim 11 wherein said control device is further operative to transmit a series of digital signals to said video recorder and wherein said configuring signals further include data relating to control codes embodied in said digital signals.

13. The method of claim 9 further including the step of generating signals at said first terminal representative of the location of said first terminal and providing said signals representative of the location of the first terminal to said second terminal.

14. The method of claim 13 wherein said signals representative of the location of the first terminal are provided as a response to an audio inquiry transmitted from said second terminal to said first terminal.

15. The apparatus of claim 1 in which the control device includes operator actuable means for placing said control device in either a first, training mode, in which said alterable memory is programmed, or a second, operating mode in which said control program is executed.

16. The apparatus of claim 1 in which the control device includes a real-time clock, and said signals transmitted from said second terminal end to said control device include signals for setting said clock.

17. The method of claim 11 wherein one of said audio inquiries requests the postal zip code of the location of the control device.

18. The method of claim 11 wherein said cable tuner has a model number, and wherein one of said audio inquiries requests said model number.

19. The method of claim 9 further including the step of disconnecting said control device from said first terminal for use in said particular application after receiving said configuring signals into said programmable memory.

20. A method of configuring an alterable control program in a television viewing system including a cable tuner connected to a multi-channel source of video programming from a computer system which is physically remote from said viewing system, comprising the step of:

transmitting an inquiry from said computer system to said viewing system requesting that an operator enter postal zip code information;

determining the geographical location of said viewing system based upon the postal zip code information entered by said operator;

selecting configuration parameters in accordance with the geographical location determined from the zip code information entered by said operator; and transmitting, from said computer system, the selected configuration parameters associated with the alteration of said alterable control program, including configuration parameters relating to the geographical location of said viewing system;

configuring said alterable control program in said viewing system using said selected configuration parameters.

* * * * *

UNITED STATES PATENT AND TRADEMARK OFFICE
CERTIFICATE OF CORRECTION

PATENT NO.  : 5,748,716
DATED       : May 5, 1998
INVENTOR(S) : Levine

It is certified that error appears in the above-indentified patent and that said Letters Patent is hereby corrected as shown below:

Column 6, line 24: Replace "(DTMP)" with --(DTMF)--.

Signed and Sealed this

Eleventh Day of August 1998

*Attest:*

*Attesting Officer*

BRUCE LEHMAN

*Commissioner of Patents and Trademarks*